United States Patent
Severin

(10) Patent No.: US 11,535,562 B2
(45) Date of Patent: *Dec. 27, 2022

(54) PARTICULATE MIXTURE COMPRISING RECYCLED ALUMINIUM SILICATE MATERIAL

(71) Applicant: VECOR IP HOLDINGS LIMITED, Kowloon (HK)

(72) Inventor: Erik Severin, Pampanga (PH)

(73) Assignee: VECOR IP HOLDINGS LIMITED, Hong Kong (HK)

( * ) Notice: Subject to any disclaimer, the term of this patent is extended or adjusted under 35 U.S.C. 154(b) by 205 days.

This patent is subject to a terminal disclaimer.

(21) Appl. No.: 17/048,232

(22) PCT Filed: Apr. 16, 2019

(86) PCT No.: PCT/EP2019/059866
§ 371 (c)(1),
(2) Date: Oct. 16, 2020

(87) PCT Pub. No.: WO2019/201965
PCT Pub. Date: Oct. 24, 2019

(65) Prior Publication Data
US 2021/0101836 A1    Apr. 8, 2021

(30) Foreign Application Priority Data

Apr. 18, 2018  (EP) .................................. 18167910
Apr. 18, 2018  (EP) .................................. 18167919
Apr. 18, 2018  (EP) .................................. 18167937

(51) Int. Cl.
| | | |
|---|---|---|
| C04B 35/18 | (2006.01) | |
| C01B 33/26 | (2006.01) | |
| C04B 33/135 | (2006.01) | |
| C04B 33/20 | (2006.01) | |
| C04B 33/34 | (2006.01) | |
| C04B 35/622 | (2006.01) | |

(52) U.S. Cl.
CPC .............. *C04B 35/18* (2013.01); *C01B 33/26* (2013.01); *C04B 33/1352* (2013.01); *C04B 33/20* (2013.01); *C04B 33/34* (2013.01); *C04B 35/62204* (2013.01); *C01P 2004/61* (2013.01); *C04B 2235/3272* (2013.01); *C04B 2235/349* (2013.01); *C04B 2235/3463* (2013.01); *C04B 2235/3472* (2013.01); *C04B 2235/36* (2013.01); *C04B 2235/422* (2013.01); *C04B 2235/5436* (2013.01); *C04B 2235/5463* (2013.01); *C04B 2235/721* (2013.01)

(58) Field of Classification Search
CPC ............ C04B 35/18; C04B 2235/3463; C04B 2235/349; C01B 33/26; C01P 2004/61
See application file for complete search history.

(56) References Cited

U.S. PATENT DOCUMENTS

| | | | |
|---|---|---|---|
| 2002/0017224 A1 | 2/2002 | Horton | |
| 2014/0094358 A1* | 4/2014 | Koszo | ................... C04B 33/138 501/141 |
| 2021/0094880 A1* | 4/2021 | Severin | ................... C01B 33/26 |

FOREIGN PATENT DOCUMENTS

| | | |
|---|---|---|
| CN | 103833331 A | 6/2014 |
| CN | 105524607 A | 4/2016 |
| EP | 2516348 B1 | 5/2017 |
| GB | 2061241 A | 5/1981 |
| KR | 20030042595 A | 6/2003 |
| WO | 9602477 A1 | 2/1996 |
| WO | 2011075783 A1 | 6/2011 |
| WO | 2012142752 A1 | 10/2012 |

OTHER PUBLICATIONS

Chandra et al., "Coal fly ash utilization: Low temperature sintering of wall tiles" Waste Management, vol. 28, No. 10, Oct. 22, 2007, pp. 1993-2002.
European Search Report for European Application No. EP18167910.1, dated Jun. 25, 2018, 18 pages.
European Search Report for European Application No. EP18167919.2, dated Jun. 18, 2018, 15 pages.
European Search Report for European Application No. EP18167937.4, dated Jun. 18, 2018, 15 pages.
International Search Report and Written Opinion for International Application PCT/EP2019/059866, dated Jul. 2, 2019, 17 pages.
Haiying et al., "Study on use of MSWI fly ash in ceramic tile", Journal of Hazardous Materials, Feb. 19, 2007, 141(1):106-14.
Shah et al., "Development of glazed wall tiles through optimal utilization of fly ash", Transactions of the Indian Ceramic Society, vol. 60, No. 3, Jan. 1, 2001, pp. 145-149.
Non Final Office Action for U.S. Appl. No. 17/048,231, dated Jan. 24, 2022, 17 pages.

* cited by examiner

*Primary Examiner* — Karl E Group
*Assistant Examiner* — Cameron K Miller
(74) *Attorney, Agent, or Firm* — RatnerPrestia

(57) ABSTRACT

A particulate mixture, suitable for use in ceramic article production, wherein the mixture includes from 30 wt % to 80 wt % recycled aluminium silicate material. The particulate mixture has a particle size distribution such that: (i) the $d_{50}$ particle size is from 10 μm to 30 μm; (ii) the $d_{70}$ particle size is less than 40 μm; and (iii) the $d_{98}$ particle size is less than 60 μm.

9 Claims, No Drawings

PARTICULATE MIXTURE COMPRISING RECYCLED ALUMINIUM SILICATE MATERIAL

CROSS-REFERENCE TO RELATED APPLICATIONS

This application is the U.S. National Phase Application filed under 35 U.S.C. § 371 claiming benefit to International Patent Application No. PCT/EP2019/059866, filed Apr. 16, 2019, which claims priority to European Application Nos. EP18167919.2, EP18167910.1 and EP18167937.4, each filed Apr. 18, 2018, and each of which applications being incorporated herein by reference in their entireties.

FIELD OF THE INVENTION

The present invention relates to a particulate mixture, suitable for use in ceramic article production, and especially ceramic porcelain floor tiles.

BACKGROUND OF THE INVENTION

There is continuing interest in the use of recycled materials in particulate mixtures that can be used in ceramic production, such as recycled aluminium silicate material. Recycled aluminium silicate material is typically derived from coal combustion products, such as fly ash. This has environmental benefits.

However, the use of such recycled aluminium silicate material in the manufacture of ceramic articles, especially ceramic porcelain floor tiles, and especially when used at higher levels, can lead to problems. This is particularly relevant for large scale production processes.

The use of recycled aluminium silicate material brings greater variability into the production process compared to conventional ceramic compositions. This greater variability is more significant when higher levels of recycled aluminium silicate material are used.

The ceramic articles, and especially ceramic porcelain floor tiles, can shrink in an inconsistent and/or excessive manner, which in turn can lead to internal stresses. This can cause defects such as fractures or weak internal structures that are prone to fracture, for example upon handling.

Other problems include black coring, and poor water absorption properties. This is especially important for ceramic porcelain floor tiles.

The present invention seeks to provide a particulate mixture that can be used to make ceramic articles, and especially ceramic porcelain floor tiles, that comprise recycled aluminium silicate material, and that exhibit no black coring, limited shrinkage, and has excellent water absorption (i.e. low) properties.

The present invention controls the particle size distribution, and in particular the $d_{50}$ particle size, to provide these good properties of avoiding black coring, having optimal shrinkage and low water absorption. Using a particle size that is too small results in unwanted black coring and excessive shrinkage, whilst increasing the particle size too much results in poor (high) water absorption properties, due to lack of vitrification. These result in very poor-quality ceramic articles such as porcelain floor tiles. Using a particle size distribution, and especially the $d_{50}$ particle size, as required by the present invention overcomes these problems and provides for a ceramic article having no black coring, acceptable shrinkage, and very low water absorption properties. This is highly desirable for ceramic porcelain floor tiles and their production. Ceramic porcelain floor tiles need to be strong and impermeable to water, and in addition they are particularly susceptible to problems of black coring. For these reasons the particulate mixture of the present invention, are especially suitable for use in ceramic porcelain floor tile production, and especially ceramic grès porcelain floor tiles.

The present invention provides a particulate mixture that enables the incorporation of recycled aluminium silicate material into ceramic articles, such as ceramic porcelain floor tiles, having excellent properties.

SUMMARY OF THE INVENTION

The present invention relates to a particulate mixture, suitable for use in ceramic article production, wherein the mixture comprises from 30 wt % to 80 wt % recycled aluminium silicate material, wherein the particulate mixture has a particle size distribution such that: (i) the $d_{50}$ particle size is from 10 μm to 30 μm; (ii) the $d_{70}$ particle size is less than 40 μm; and (iii) the $d_{98}$ particle size is less than 60 μm.

DETAILED DESCRIPTION OF THE INVENTION

Particulate Mixture:

Typically, the particulate mixture is suitable for use in ceramic article production, and especially suitable for use in ceramic porcelain floor tile production. Typically, a ceramic production process involves delivering the particulate mixture to a press, such as a hydraulic press, and pressing the particulate mixture into a green article. The green article is then typically transferred to a dryer, then to a kiln, where it is fired to form a ceramic article. Standard ceramic production processes known in the art are suitable.

The particulate mixture comprises from 30 wt % to 80 wt % recycled aluminium silicate material, preferably from greater than 50 wt % to 80 wt %, or from 60 wt % to 80 wt %, or even from 70 wt % to 80 wt % recycled aluminium silicate material. The particulate mixture may also comprise from 30 wt % to 75 wt %, or from 30 wt % to 70 wt %, or from above 35 wt % to 75 wt %, or from above 35 wt % to 70 wt %, or from 40 wt % to 75 wt %, or from 40 wT % to 70 wt % recycled aluminium silicate material. The recycled aluminium silicate material is described in more detail below.

The particulate mixture comprises from 20% to 70 wt %, or from 20 wt % to 50 wt % or less, or from 20 wt % to 40 wt %, or from 20 wt % to 30 wt %, or from 30 wt % to 60 wt % material selected from clay, shale, feldspar, glass and any combination thereof. A preferred material is a combination of clay and feldspar. A suitable clay is a standard clay such as Ukrainian clay. A preferred clay is a combination of standard clay and high plasticity clay. The weight ratio of standard clay to high plasticity clay may in the range of from 2:1 to 5:1. Suitable clay is a high plasticity clay such as bentonite clay. Typically, high plasticity clay has an Atterburg's plasticity index of greater than 25.0. Typically, standard clay has an Atterburg's plasticity index of 25.0 or less.

Typically, the particulate mixture has a particle size distribution such that:

(i) the $d_{50}$ particle size is from 10 μm to 30 μm;

(ii) the $d_{70}$ particle size is less than 40 μm; and (iii) the $d_{98}$ particle size is less than 60 μm.

Preferably, the particulate mixture has a particle size distribution such that:
(i) the $d_{50}$ particle size is from 10 µm to 25 µm;
(ii) the $d_{70}$ particle size is less than 30 µm; and
(iii) the $d_{98}$ particle size is less than 55 µm.

The $d_{50}$ particle size of the particulate mixture is typically in the range of from 10 µm to 30 µm, or from 10 µm to 25 µm, or from 15 µm to 20 µm. The $d_{70}$ particle size of the particulate mixture is typically less than 40 µm, or less than 30 µm, and typically is in the range of from 15 µm to 35 µm, or from greater than 20 µm to 30 µm. The $d_{98}$ particle size of the particulate mixture is typically less than 60 µm, or less than 55 µm, and typically is in the range of from 40 µm to less than 60 µm, or from 45 µm to less than 55 µm.

The particulate mixture may also have a particle size distribution such that the $d_{10}$ particle size is in the range of from 3 µm to 12 µm, or from 4 µm to 11 µm. The particulate mixture may also have a particle size distribution such that the $d_{90}$ particle size is less than 50 µm, or less than 45 µm, or less than 40 µm, or is in the range of from 30 µm to 40 µm. The particulate mixture may also have a particle size distribution such that the $d_{30}$ particle size is in the range of from above 6 µm to 20 µm, or from above 10 µm to 15 µm.

The particle size distribution of the particulate mixture can be controlled by any combination of milling, classification and/or blending. Separation of particulate mixtures into a coarse fraction (or cut) and a fine fraction (or cut) is conveniently done by air classification when there are smaller particles which would blind the screens used in mechanical sieves. The size of the coarse and fine fractions can be determined by the operation of the classifier. A typical example is the Micron Separator Air Classifier from Hosokawa Micron. The machinery is able to classify particles by balancing the centrifugal force of the rotor and the centripetal force of the air. Material to be separated is pulled through by the fan into the inlet duct and up to the rotor, where the two opposing forces classify it. Finer particles are more susceptible to centripetal forces whereas coarse particles are more prone to centrifugal force. These forces flow coarse materials down the inside wall of the machine, emptying out the materials in the coarse particle discharge, while finer particles travel through the air current into the rotor and then discharged through the upper outlet duct. By changing the rotational speed of the internal rotor, the size of the coarse and fine cuts can be easily adjusted. Increasing the speed of the rotor will increase the size of the split between the coarse and fine fractions.

Comminution systems very commonly include a mill in combination with a classifier. These classifiers can be closely integrated with the mill, for example the Hosokawa Micron Air Classifier Mill MS 1500 AC, or separate pieces of equipment. Suitable mills include the Palla Vibrating Mill from MBE Coal and Mineral GmbH or the Hosokawa Micron Mikro Pulverizer® Hammer & Screen Mill. The particle distribution can be adjusted by the selective blending of different sized fractions so as to change the whole distribution of the mix rather than just an upper or a lower size limit.

The particle size distribution of the particulate mixture can be controlled by any suitable particle size control techniques. One suitable technique is air classification.

The particle size distribution of the particulate mixture is carefully controlled in the present invention. Standard ceramic mixtures known in the art and routinely used in ceramic production processes, have larger particle size distributions, for example having a $d_{98}$ particle size of 63 µm or larger. By controlling the particle size distribution of the particulate mixture, the present invention provides a particulate mixture that is suitable for use in ceramic production, and which results in a ceramic article having a much smoother surface. Without wishing to be bound by theory, the inventor believes that the particle size distribution of the particulate mixture required by the present invention ensures that any impurity that may be present in the particulate mixture and that may end up on the surface of any resultant ceramic article is not significantly noticeable by the human eye. In addition, the particle size distribution required by the present invention also ensures that any combustible impurities present in the particulate mixture can ignite during the heating stage of the ceramic production. This ensures that these impurities are burnt out before the sintering stage of the ceramic production process, typically before the pores of the article close, which helps avoid black coring. This allows any combustion gases to escape from the article, which in turn protects the article from any unwanted bloating during the ceramic production process.

The particulate mixture may comprise a binder, typically from 0.1 wt % to 3.0 wt % binder, or from 0.5 wt % to 2.0 wt % binder. Suitable binders are described in more detail below. Typically, the incorporation of binder into the particulate mixture imparts sufficient strength to the resultant green article which is formed from the particulate mixture, for example by pressing, during a ceramic production process.

The particulate mixture can be made by blending the individual components in any mixer capable of imparting sufficient shear to the mix to disperse the materials. Suitable mixers could include high shear mixers such as the Hosokawa Micron Flexomixer series or Loedige CB mixers. Other suitable mixer could include lower shear mixers such as ribbon blenders or paddle mixers or continuous screw mixers. Suitable mixers include the Model 50 X 10 Ribbon Blender from Morton Mixers Ltd and the Bella Model XN paddle mixer from Dynamic Air. The mixers can be continuous or batch. An alternative is to use pneumatic mixing where the individual materials are continuously fed to and conveyed by a pneumatic conveying system. The materials typically become highly dispersed, and well mixed in the air stream within the pneumatic conveying system. Other suitable types of continuous mixer are conveying screws, especially those with back-mixing elements to enhance mixing. An example of a suitable conveying screw mixer for making the particulate mix is the MESC200 model from Hydroscrew Ltd. High-shear mixers are capable of making the particulate mixture from the separate materials by mixing, typically for a few seconds. Lower shear mixers will typically take from 1 to 10 minutes of mixing to make suitable homogenous mixtures. Another possible way to make the particulate mixture is to feed the individual materials into a grinder. The high shear and intense air flows and intense mixing typically experienced in a mill will very rapidly create a homogenous mixture which can then be classified as needed. Most mills will be very capable of mixing the materials as well as grinding them, including any mills described earlier.

The recycled aluminium silicate can be mixed with other components such as clays and/or feldspars using the mixers and methods described earlier. The various materials can be added separately to a mixer or can be pre-mixed in process equipment prior to the main mixing.

A preferred process for making the particulate mixture incorporating recycled aluminium silicate is to use feed the different materials into a comminution process and use any milling step, in combination with pneumatic transport and blending, to blend and mix the individual materials so as to form a homogenous mixture.

Other materials may need to be added to the particulate mixture, such as polymers and plasticisers, as needed to include specific properties or to increase the green strength of the ceramic article prior to firing. Any materials which are in powder form can be added as above. However, any material in aqueous solution or suspension will typically need to be added in a high-shear mixer such as the Flexomixer or similar, or the Loedige CB. Any liquid materials added to the mix will typically need to be finely dispersed into the mix by using a high-shear mixing step to finely disperse the liquid throughout the particulate mix.

Any other material that can be added to impart specific properties to the finished ceramic article can be incorporated into the particulate mixture during the blending process.

Preferably, the particulate mixture is not prepared by a spray-drying. Such unsuitable spray-drying process steps involved making an aqueous slurry of the recycled aluminium silicate material and any other solid material, such as the clay and/or feldspar, and spray-drying the aqueous slurry to form the particulate mixture. Such processes involve a significant amount of energy and are not desirable.

The particulate mixture may comprise from 0.5 wt % to 8.0 wt %, or from 1.0 wt % to 8.0 wt %, or from 1.0 wt % to 7.0 wt %, or from 1.0 wt % to 6.0 wt %, or from 1.0 wt % to 5.0 wt %, or from 1.0 wt % to 4.0 wt %, or from 1.0 wt % to 3.0 wt % combustible carbon. The recycled aluminium silicate material may comprise greater than 2.0 wt % to 8.0 wt %, or from 2.5 wt % to 7.0 wt % combustible carbon.

The particulate mixture may comprise from 0.5 wt % to 12.0 wt %, or from 0.5 wt % to 11.0 wt %, or from 0.5 wt % to 10 wt %, or from 0.5 wt % to 9.0 wt %, or from 0.5 wt % to 8.0 wt %, or from 0.5 wt % to 7.0 wt %, or from 0.5 wt % to 6.0 wt %, or from 0.5 wt % to 5.0 wt %, or from 0.5 wt % to 4.0 wt %, or from 0.5 wt % to 3.0 wt %, or from 0.5 wt % to 2.0 wt % iron oxide.

Recycled Aluminium Silicate Material:

Typically, the recycled aluminium silicate material is derived from coal combustion products.

Typically, the recycled aluminium silicate material is obtained by subjecting the coal combustion products, such as ash, to a beneficiation process. The recycled aluminium silicate is typically beneficiated fly ash.

Typically, the recycled aluminium silicate material is obtained by subjecting the coal combustion products, such as ash, to an initial particle size screen (such as a 1 mm screen) to remove any large objects, and then to one or more smaller particle size screens (such as 250 µm and/or 125 µm) to remove large particles. This screened material is then typically subjected to a magnetic separation step to reduce the iron oxide content. This magnetic separation step can involve a first magnetic separation step, for example at a gauss of 8,000 or around 8,000, followed by a second magnetic separation step, for example at a gauss of 30,000, or around 30,000. Alternatively, only one magnetic separation step may be used, for example at a gauss of 8,000 or around 8,000. This material is then typically subjected to a carbon reduction step, such as calcination or flotation, preferably calcination. The material may also be subjected to an electrostatic separation technique.

The recycled aluminium silicate material is typically predominately aluminium silicate. The recycled aluminium silicate material typically comprises combustible carbon and iron oxide; and may additionally comprise trace amounts of other materials such as sodium salts and/or magnesium salts, and metal oxides other than iron oxide, such as sodium oxide, potassium oxide and titanium oxide. The recycled aluminium silicate material typically comprises at least 88 wt % aluminium silicate, preferably at least 90 wt % aluminium silicate. Depending on the levels of the combustible carbon and iron oxide, the recycled aluminium silicate may even comprise at least 92 wt %, or at least 94 wt %, or at least 96 wt %, or even at least 98 wt % aluminium silicate.

The recycled aluminium silicate material may comprise:
(a) optionally, from 0.5% to 8.0% combustible carbon; and
(b) optionally, from 0.5% to 12.0% iron oxide.

The recycled aluminium silicate material may comprise from 0.5 wt % to 8.0 wt %, or from 1.0 wt % to 8.0 wt %, or from 1.0 wt % to 7.0 wt %, or from 1.0 wt % to 6.0 wt %, or from 1.0 wt % to 5.0 wt %, or from 1.0 wt % to 4.0 wt %, or from 1.0 wt % to 3.0 wt % combustible carbon. The recycled aluminium silicate material may comprise greater than 2.0 wt % to 8.0 wt %, or from 2.5 wt % to 7.0 wt % combustible carbon.

One preferred recycled aluminium silicate material is obtained by removing all of the combustible carbon from the coal combustion product, and then adding combustible carbon back to this nil-combustible carbon material. In this way, the level of combustible carbon present in the recycled aluminium silicate material can be carefully, and tightly, controlled.

The level of combustible carbon present in the recycled aluminium silicate material can be controlled, typically reduced, by techniques such as calcination, electrostatic removal, and flotation techniques such as froth-air flotation techniques.

Such processes for controlling the level of combustible carbon are well described in the art.

Suitable equipment for calcining materials to reduce carbon levels include the Staged Turbulent Air Reactors supplied by SEFA Group of Lexington, S.C. These reactors heat incoming ash to further burn out the residual carbon.

Another well used technique is triboelectrostatic separation whereby carbon particles can be removed from the bulk ash material, especially after comminution, by passing through an electrostatic separator. The carbon particles can be charged to have an opposite charge to the non-carbon particles and can then be removed by passing the ash material through an electrostatic separator. Suitable equipment for this include the STET separators supplied by ST Equipment and Technologies LLC of Needham, Mass.

Suitable froth flotation equipment includes the Dorr-Oliver and Wemco units supplied by FLSmidth.

These processes can all reduce excessively high carbon levels. In calcination processes, increasing the operating temperatures will further reduce the carbon levels. In electrostatic separation, increasing the voltages used in the separation units, and increasing the degree of comminution of the material entering the separator, can be used to further reduce the carbon levels.

In froth flotation processes, increasing the degree of milling of the incoming material to further release unburnt carbon particles, increasing the amount of air used and using additives such as surfactants, can all be used to control the reduction in the levels of carbon.

Carbon levels can be increased by the addition of finely-ground combustible carbon-rich materials into the particulate mixture. It may be especially preferable to add any combustible carbon-rich material into any comminution steps involved in the preparation of the particulate mixture.

It is also preferred if the combustible carbon-rich material is that material previously extracted from combustible carbon-rich ash. This maximises efficiency. Other sources, such as ground coal, can certainly be used. Preferably, the particle size of the combustible carbon-rich material in the particulate mixture is comparable to the particle sizes of the other materials present in the particulate mixture.

The recycled aluminium silicate material may comprise from 0.5 wt % to 12.0 wt %, or from 0.5 wt % to 11.0 wt %, or from 0.5 wt % to 10 wt %, or from 0.5 wt % to 9.0 wt %, or from 0.5 wt % to 8.0 wt %, or from 0.5 wt % to 7.0 wt %, or from 0.5 wt % to 6.0 wt %, or from 0.5 wt % to 5.0 wt %, or from 0.5 wt % to 4.0 wt %, or from 0.5 wt % to 3.0 wt %, or from 0.5 wt % to 2.0 wt % iron oxide.

One preferred recycled aluminium silicate material is obtained by removing all of the iron oxide from the coal combustion product, and then adding iron oxide back to this nil-iron oxide material. In this way, the level of iron oxide present in the recycled aluminium silicate material can be carefully, and tightly, controlled.

The iron oxide level in the recycled aluminium silicate is typically controlled by a process of detecting the iron oxide level in the particulate mixture and, if it is out of spec, then either increasing the amount of iron oxide removed from the recycled aluminium silicate or adding iron-oxide rich material into the aluminium silicate.

Iron oxide levels can be reduced by passing the recycled aluminium silicate through one or more magnetic separators. These apply a magnetic field to the passing stream of recycled aluminium silicate which allows magnetically-susceptible materials, such as iron oxide, to be removed from the bulk stream. Magnetic materials such as magnetite can be removed by using a lower intensity magnetic field of up to 10,000 Gauss (=1 Tesla). Less magnetically susceptible minerals such as hematite can also be extracted using magnetic separation but typically need a much high magnetic intensity field of up to 2 or 3 Tesla. Often magnetic separation processes will use a low intensity separation step followed by a high intensity separation step. Suitable equipment for extraction of iron oxide from recycled aluminium silicate includes the WDY range of magnetic separators made by the Foshan Wandaye Machinery Equipment Company Ltd of Foshan City, Guangdong, China. The model WD-7A-300 could be used. Magnetic separation could also be done on wet slurries but this is not a preferred route for treating recycled aluminium silicate due to the need for a secondary drying step.

The iron oxide level in the recycled aluminium silicate can be increased by the controlled addition of iron oxide rich material to the recycled aluminium silicate. Iron oxide minerals such as magnetite or hematite would be most preferable but other sources could be used. An especially preferred solution would be the re-utilisation of iron oxides removed from prior processing of recycled aluminium silicate with excessively high levels of iron oxide. Preferably, the iron oxide rich particles have a comparable size to the recycled aluminium silicate so as to ensure homogeneity. The iron-oxide rich material could be added to the recycled aluminium silicate prior to any mixing or milling steps to aid homogeneity.

Preferably, the recycled aluminium silicate material comprises:
(a) from 1.0% to 3.0% combustible carbon; and
(b) from 0.5% to 2.0% iron oxide.

The recycled aluminium silicate material may comprise:
(a) from 0.5% to 1.0 wt % combustible carbon; and (b) from 2.5 wt % to 3.0 wt % iron oxide. This may be preferred when the particulate mixture is to be used in a thermal refractory ceramic production process.

The recycled aluminium silicate material may comprise:
(a) from 0.5% to 1.0 wt % combustible carbon; and (b) from 4.0 wt % to 4.5 wt % iron oxide. The levels of combustible carbon and/or iron oxide can be controlled so as to control the aesthetic properties of the ceramic article that can be produced by the particulate mixture.

The recycled aluminium silicate material typically has a particle size distribution such that at least 99 wt % of the recycled material has a particle size of below 75 micrometers. The recycled aluminium silicate material may have a particle size distribution such that substantially all of the recycled material has a particle size of below 75 micrometers.

The recycled aluminium silicate material typically has a particle size distribution such that:
(i) the $d_{50}$ particle size is from 10 μm to 30 μm;
(ii) the $d_{70}$ particle size is less than 40 μm; and
(iii) the $d_{98}$ particle size is less than 60 μm.

The recycled aluminium silicate material may have a particle size distribution such that:
(i) the $d_{50}$ particle size is from 10 μm to 25 μm;
(ii) the $d_{70}$ particle size is less than 30 μm; and
(iii) the $d_{98}$ particle size is less than 55 μm.

The recycled aluminium silicate material may also have a particle size distribution such that the $d_{10}$ particle size is in the range of from 3 μm to 10 μm, or from 4 μm to 6 μm. The recycled aluminium silicate material may also have a particle size distribution such that the $d_{30}$ particle size is in the range of from above 6 μm to 20 μm, or from above 10 μm to 15 μm. The recycled aluminium silicate material may also have a particle size distribution such that the $d_{90}$ particle size is less than 50 μm, or less than 45 μm, or less than 40 μm, or is in the range of from 30 μm to 40 μm.

The particle size distribution of the recycled aluminium silicate material can be controlled by similar means as described above for controlling the particle size distribution of the particulate mixture. The particle size distribution of the recycled aluminium silicate material can be controlled by any combination of milling, classification and/or blending.

Combustible Carbon:

Typically, combustible carbon is carbon that can be measured by a loss on ignition (LOI) method. It is this combustible carbon that needs to be carefully controlled in the particulate mixture. The recycled aluminium silicate material may comprise non-combustible carbon such as non-combustible carbide, typically at very low levels (trace amounts).

Iron Oxide:

Typically, the iron oxide content is measured by x-ray fluorescence spectrometry (XRF).

Binder:

Suitable optional binders are organic binders. Suitable organic binders include polyvinyl alcohol, superplasticizers, methylcellulose, carbomethoxy cellulose, or dextrin. Other binders will be known to those skilled in the art. The organic binder may be in the form of a liquid.

Method of Measuring the Combustible Carbon Content:

The level of combustible carbon is measured by the Loss on Ignition (LOI) test as per ASTM D7348. In this test, 1 g of fly ash is first dried at 150° C. to dry the sample. The sample is then cooled and weighed. Then the sample is heated in a step wise manner over a two-hour period to reach 500° C.

Method of Measuring Iron Oxide Content:

The level of iron oxide is measured by X-ray fluorescence. The typical particle size of the recycled aluminium silicate is sufficiently small that the technique is suitable for accurate measurement. The technique works by the excitation of the sample using high energy gamma or X-rays. This causes an ionisation of the atoms present which then emit characteristic frequency EM radiation which is dependent on the type of atom. Analysis of the intensity of different frequencies allows an elemental analysis to be made. Suitable equipment would be the Varta range of XRF analyzers supplied by Olympus. The equipment detects elemental iron and the result is most usually converted to the corresponding level of $Fe_2O_3$.

Method of Measuring Particle Size Distribution:

The particle size distribution is measured by laser diffraction. A suitable standard for size analysis by laser diffraction is given in ISO 8130-13 "Coating powders Part 13. Particle size analysis by laser diffraction". Suitable analysers meeting this standard are made by Horiba Instruments of Irvine, Calif., USA; Malvern Instruments of Worcestershire, United Kingdom; Sympatec GmbH of Clausthal-Zellerfeld, Germany; Beckman-Coulter of Fullerton, Calif., USA. A suitable size analyser is the Mastersizer 2000 by Malvern Instruments. Typically, the "dry" analysis technique is used where the material is tested as a powder stream, rather than the wet method where the test material is dispersed in a fluid first.

The measurement is typically done as per the manufacturer's instruction manual and test procedures.

The results are typically expressed in accordance with ISO 9276-1:1998, "Representation of results of particle size analysis—Part 1: Graphical Representation", FIGURE A.4, "Cumulative distribution Q3 plotted on graph paper with a logarithmic abscissa".

EXAMPLES

Three ceramic compositions, containing equal amounts of recycled aluminium silicate material, clay and feldspar, but with different particle size distributions, were prepared and formed into green ceramic test articles of equal dimensions and weights.

These green test articles were then all fired simultaneously in an oven, thus experiencing identical conditions. The resulting ceramic articles were tested for evidence of black coring and for water absorption. The testing showed that only the composition with the inventive particle size distribution made acceptable ceramics without black coring or unacceptably high moisture absorption.

Three samples of recycled aluminium silicate material containing 3.0 wt % $Fe_2O_3$ and 7.6 wt % carbon were mixed with clay and sodium feldspar to make a mixture having the following properties. Particle size distributions and iron oxide and carbon levels of the recycled aluminium silicate test materials are shown below.

|  | Recycled aluminium silicate material A | Recycled aluminium silicate material B | Recycled aluminium silicate material C |
| --- | --- | --- | --- |
| d50 (μm) | 7.4 | 21.3 | 40.8 |
| d70 (μm) | 9.8 | 28.1 | 49.2 |
| d99 (μm) | 22.2 | 53.0 | 54.9 |
| $Fe_2O_3$ (wt %) | 3.0 | 3.0 | 3.0 |
| Carbon (wt %) | 7.6 | 7.6 | 7.6 |

Each of the recycled aluminium silicate materials was then mixed with the indicated amounts of clay and feldspar to make three test batches of the following compositions and properties.

|  | Test Batch A (comparative) | Test Batch B (invention) | Test Batch C (comparative) |
| --- | --- | --- | --- |
| Recycled aluminium silicate material (wt %) | 60.8 | 60.8 | 60.8 |
| Clay (wt %) | 23.4 | 23.4 | 23.4 |
| Feldspar (wt %) | 9.4 | 9.4 | 9.4 |
| $Fe_2O_3$ (wt %) | 1.8 | 1.8 | 1.8 |
| Carbon (wt %) | 4.6 | 4.6 | 4.6 |
| d50 (μm) | 6.6 | 20.1 | 38.0 |
| d70 (μm) | 9.1 | 26 | 45.8 |
| d99 (μm) | 26.2 | 48.6 | 50.9 |

The three compositions were then used to make ceramic test articles. Ten grams of each mixture were mixed with 0.8 g of 10 wt % aqueous dextrin solution, and each wetted mixture was pressed into a test ceramic disk of diameter 26 mm and thickness 10 mm using a pressure of 40 MPa. The sample disks were dried at 110° C. to constant weight (about 4 hours), then fired together in an oven at a constant ramp of 3° C./min to a temperature of 1230° C., soaked for 15 minutes at the top temperature, and then cooled for 7 hours.

After this, the samples were then visually inspected for evidence of black coring, measured for their water absorption according to ISO 10545-3, and radial shrinkage expressed as percent reduction in the initial diameter of the test ceramic disk. These values provide an indicator for the degree of vitrification of the ceramic articles.

Results are as follows:

|  | Test Batch A (comparative) | Test Batch B (invention) | Test Batch C (comparative) |
| --- | --- | --- | --- |
| Black coring | Present | Not present | Not present |
| Water absorption | 0.2% | 1.2% | 8.6% |
| Radial Shrinkage | 11% | 8.4% | 5% |

The data shows the benefits of the inventive particle size distribution for producing porcelain tiles with high levels of recycled materials, and with sufficient clay and other materials to make industrially robust ceramic articles.

The invention claimed is:

1. A particulate mixture, suitable for use in ceramic article production, wherein the mixture comprises from 30 wt % to 80 wt % recycled aluminium silicate material, wherein the particulate mixture has the following particle size distribution:
    (i) a $d_{50}$ particle size is from 10 μm to 30 μm;
    (ii) a $d_{70}$ particle size is less than 40 μm; and
    (iii) a $d_{98}$ particle size is less than 60 μm.

2. A particulate mixture according to claim 1, wherein the recycled aluminium silicate material comprises:
    (a) from 0.5% to 8.0% combustible carbon; and
    (b) from 0.5% to 12.0% iron oxide.

3. A particulate mixture according to claim 1, wherein the particulate mixture comprises from 40 wt % to 70 wt % recycled aluminium silicate material.

4. A particulate mixture according to claim 1, wherein the recycled aluminium silicate has the following particle size distribution:
    (i) the $d_{50}$ particle size is from 10 μm to 25 μm;
    (ii) the $d_{70}$ particle size is less than 30 μm; and
    (iii) the $d_{98}$ particle size is less than 55 μm.

5. A particulate mixture according to claim 1, wherein the mixture comprises from greater than 50 wt % to 80 wt % recycled aluminium silicate material.

6. A particulate mixture according to claim 1, wherein the mixture comprises from 20% to 70 wt % material selected from clay, shale, feldspar, glass or any combination thereof.

7. A particulate mixture according to claim 3, wherein the mixture comprises from 30% to 60 wt % material selected from clay, shale, feldspar, glass or any combination thereof.

8. A particulate mixture according to claim 1, wherein the recycled aluminium silicate material has a particle size distribution such that at least 99 wt % of the recycled aluminium silicate material has a particle size of below 75 micrometers.

9. A particulate mixture according to claim 1, wherein the recycled aluminium silicate material is derived from coal combustion products.

* * * * *